(12) United States Patent
Kim

(10) Patent No.: US 10,301,757 B2
(45) Date of Patent: May 28, 2019

(54) DRIVE MOTOR FOR DRUM WASHING MACHINE, AND DRUM WASHING MACHINE HAVING SAME

(71) Applicant: AMOTECH CO., LTD., Incheon (KR)

(72) Inventor: Byung Soo Kim, Anyang-si (KR)

(73) Assignee: AMOTECH CO., LTD., Incheon (KR)

( * ) Notice: Subject to any disclaimer, the term of this patent is extended or adjusted under 35 U.S.C. 154(b) by 888 days.

(21) Appl. No.: 14/809,544

(22) Filed: Jul. 27, 2015

(65) Prior Publication Data
US 2015/0330010 A1   Nov. 19, 2015

Related U.S. Application Data

(62) Division of application No. PCT/KR2014/000759, filed on Jan. 27, 2014.

(30) Foreign Application Priority Data

Jan. 28, 2013 (KR) .......................... 10-2013-0009295
Jan. 28, 2013 (KR) .......................... 10-2013-0009297
(Continued)

(51) Int. Cl.
*H02K 5/24* (2006.01)
*D06F 37/20* (2006.01)
(Continued)

(52) U.S. Cl.
CPC .......... *D06F 37/206* (2013.01); *D06F 37/304* (2013.01); *H02K 1/185* (2013.01);
(Continued)

(58) Field of Classification Search
CPC .......... H02K 1/187; H02K 3/28; H02K 3/325; H02K 5/16; H02K 5/24; D06F 37/206; D06F 37/304; D06F 37/269
(Continued)

(56) References Cited

U.S. PATENT DOCUMENTS

| | | | |
|---|---|---|---|
| 7,950,258 B2 * | 5/2011 | Choi | D06F 37/206 68/140 |
| 8,087,148 B2 * | 1/2012 | Kim | D06F 37/304 29/525.01 |
| 8,621,896 B2 * | 1/2014 | Kim | D06F 37/304 68/140 |

FOREIGN PATENT DOCUMENTS

| | | |
|---|---|---|
| KR | 1020030050286 | 6/2003 |
| KR | 1020060060887 | 6/2006 |

(Continued)

OTHER PUBLICATIONS

International Search Report—PCT/KR2014/000759 dated May 12, 2014.

*Primary Examiner* — Thanh Lam
(74) *Attorney, Agent, or Firm* — Cantor Colburn LLP

(57) ABSTRACT

A drive motor for a drum washing machine including: a stator includes a stator core, a bobbin of in an insulating material and that is wrapped on an outer surface of the stator core, and a coil that is wound around the outer surface of the bobbin; a rotor that is arranged with a predetermined air gap from the stator, and whose one end is connected to a rotating shaft fixed on a rear surface of a drum; and a cover member to which the other end of the rotating shaft is rotatably supported, and that is fixed to a rear surface of the tub, in which the stator core is mounted. The drive motor can shorten a manufacturing process by removing a step of assembling the stator in the tub, and the bobbin is integrally formed with a buffer portion disposed between the stator core and the cover member.

11 Claims, 13 Drawing Sheets

(30) Foreign Application Priority Data

Jun. 19, 2013 (KR) .................. 10-2013-0070308
Jun. 19, 2013 (KR) .................. 10-2013-0070309

(51) Int. Cl.
*D06F 37/30* (2006.01)
*H02K 5/16* (2006.01)
*H02K 1/18* (2006.01)
*H02K 3/32* (2006.01)
*H02K 3/28* (2006.01)
*D06F 37/26* (2006.01)

(52) U.S. Cl.
CPC ............... *H02K 3/28* (2013.01); *H02K 3/325* (2013.01); *H02K 5/16* (2013.01); *H02K 5/24* (2013.01); *D06F 37/269* (2013.01)

(58) Field of Classification Search
USPC .................................................. 310/51, 194
See application file for complete search history.

(56) References Cited

FOREIGN PATENT DOCUMENTS

| | | |
|---|---|---|
| KR | 1020100073450 | 7/2010 |
| KR | 1020110139675 | 12/2011 |

\* cited by examiner

DRIVE MOTOR FOR DRUM WASHING MACHINE, AND DRUM WASHING MACHINE HAVING SAME

CROSS REFERENCE TO RELATED APPLICATIONS

This application is a divisional of International Application No. PCT/KR2014/000759, filed on Jan. 27, 2014, which claims priority to and the benefit of Korean Application Nos. 10-2013-0009295 filed on Jan. 28, 2013; 10-2013-0009297 filed on Jan. 28, 2013; 10-2013-0070308 filed on Jun. 19, 2013; and 10-2013-0070309 filed on Jun. 19, 2013, in the Korean Patent Office, the entire contents of which are incorporated herein by reference.

TECHNICAL FIELD

The present invention relates to a drive motor for a drum washing machine and a drum washing machine having the same.

BACKGROUND ART

In general, a drum washing machine includes: a tub that is supported in the inside of a case forming an external appearance for receiving washing water; a drum that is rotatably disposed inside the tub to perform washing and dehydration; a motor that is attached to the bottom of the drum and connected to the drum, to thus drive the drum.

The motor includes: a rotating shaft that is connected to the drum and for rotating the drum; a stator that is fixed to the bottom of the tub and to which power is applied; and a rotor that is arranged with a predetermined gap on the outer and inner peripheral surfaces of the stator and is rotated by interaction with the stator and connected with the rotating shaft.

As disclosed in Korean Patent Publication No. 10-0774165, a conventional drum washing machine motor mounting structure includes: a tub in which an escape portion for mounting electronic components such as connectors and the Hall sensors together with a tub bracket fixing boss of a rear wall; a tub bracket that is engaged with the tub bracket fixing boss of the rear wall and in which another escape portion is formed in correspondence to the escape portion of the tub; a stator that is engaged with the tub bracket; and a base frame that is engaged with the tub rear wall together with the tub bracket on the rear surface of the stator.

In general, the conventional drum washing machine is configured to precisely set an assembly position of the stator by using the tub bracket of a metallic material, in order to easily match concentricity among the stator mounted on the rear surface of the tub, the rotating shaft, and the rotor which are set to position by bearings mounted in the tub, when mounting a drive motor.

In this case, the two bearings for supporting the rotating shaft of the motor are mounted in the tub and the tub bracket, and thus it is difficult to secure a sufficient distance between the two bearings, to thus make it difficult to support the rotating shaft stably.

Further, the tub bracket of the metallic material is in direct contact with the stator of the metallic material, and thus vibration of the motor is passed to the tub as it is, to thereby cause a problem that vibration takes place in a washing machine.

Furthermore, the conventional drum washing machine motor mounting structure is configured so that a separate base frame is provided on a rear surface of the stator, in order to improve the rigidity of the tub bracket and the strength of the tub, to thereby cause problems such as a complicated structure and a complex manufacturing process.

SUMMARY OF THE INVENTION

To solve the above problems or defects, it is an object of the present invention to provide a drive motor for a drum washing machine and a drum washing machine having the same, in which a tub bracket for fixing a stator can be removed, and the stator is attached to a cover member in advance, to thus shorten a production process as the cover member is assembled with the tub, thereby improving the productivity.

It is another object of the present invention to provide a drive motor for a drum washing machine and a drum washing machine having the same, in which a buffer portion that is formed integrally with a bobbin is provided between a cover member of a metallic material and a stator core of a metallic material, to thus prevent vibration of a motor from being transmitted to the drum washing machine.

It is still another object of the present invention to provide a drive motor for a drum washing machine and a drum washing machine having the same, in which bearings for supporting one end of a rotating shaft is provided at a center portion of the drive motor, a cover member on the outer peripheral portion of which a stator is mounted is attached to a rear surface of a tub, to thereby automatically match concentricity between a rotor coupled to the rotating shaft and the stator, and to thus secure a sufficient clearance between the bearings thereby providing a stable support of the rotating shaft.

It is yet another object of the present invention to provide a drive motor for a drum washing machine and a drum washing machine having the same, in which a cover member is assembled with a tub in a manner to surround a rotor externally to thereby block noise generated with the rotation of the rotor from being transmitted to the outside of the drum washing machine.

The objects of the present invention are not limited to the above-described objects, and other objects and advantages of the present invention can be appreciated by the following description and will be understood more clearly by those of ordinary skill in the art from embodiments of the present invention.

To accomplish the above and other objects of the present invention, according to an aspect of the present invention, there is provided a drive motor for a drum washing machine, the drum washing machine drive motor comprising: a stator including a stator core, a bobbin of in an insulating material and that is wrapped on an outer surface of the stator core, and a coil that is wound around the outer surface of the bobbin; a rotor that is arranged with a predetermined air gap from the stator, and whose one end is connected to a rotating shaft fixed on a rear surface of a drum; and a cover member to which the other end of the rotating shaft is rotatably supported, and that is fixed to a rear surface of the tub, in which the stator core is mounted.

Preferably but not necessarily, the drive motor for a drum washing machine further comprises a buffer portion that is formed integrally with the bobbin and is disposed between the stator core and the cover member, to thus block vibration generated in a motor from being transmitted to the washing machine.

Preferably but not necessarily, the cover member comprises: a bearing mounting portion to which a bearing for rotatably supporting the rotating shaft is fixed; a cover portion that is extended in a disc shape from the outer surface of the bearing mounting portion to cover the rear surface of the drive motor; a stator fixing portion that is formed at the end of the cover portion, and to which the stator is fixed; and a tub mounting portion that is extended from the stator fixing portion and that is mounted on the rear surface of the tub.

Preferably but not necessarily, the stator core comprises: a first core portion on which a coil is wound; and a second core portion that is integrally extended from the outer surface of the first core portion and that is secured to the cover member.

Preferably but not necessarily, a fixing manner between the stator core and the cover member employs any one of: a method of fastening between the second core portion and the cover member with a bolt; a method of forming a projection on the cover member and inserting the projection into the first core portion, to then be thermally bonded into fusion splice, and a method of press-fitting the stator core into the cover member.

Preferably but not necessarily, the bobbin is formed to wrap around the outer surface of the stator core, in which a pair of partition walls are vertically extended from both sides of the bobbin, respectively, to thus prevent the coil from seceding, and wherein the buffer portion is extended from each of the partition walls and is formed to wrap around the outer surface of the second core portion.

Preferably but not necessarily, the stator fixing portion of the cover member comprises: a first contact portion that is bent at a right angle to contact the outer surface of each of the partition walls; and a second contact portion that is extended from the first contact portion in the horizontal direction to contact the buffer portion.

Preferably but not necessarily, the drive motor further comprises a buffer member that is disposed between the stator core and the cover member to thus block vibration generated by the motor from being transmitted to the washing machine.

Preferably but not necessarily, the buffer member is made of a material to absorb vibration, and is formed in a ring shape, in which a plurality of through-holes through which bolts pass are formed in the circumferential direction and a plurality of fixing brackets for fixing the buffer member to the cover member are formed in the outer surface of the buffer member.

Preferably but not necessarily, the drive motor further comprises a wiring unit that is provided in the buffer member and for electrically connecting between the coils wound on the respective stator cores.

Preferably but not necessarily, the wiring unit comprises: a terminal pocket that is integrally formed with the buffer member and into which the coil is inserted; and a coil terminal made of a metallic material, that is inserted into the terminal pocket, and for electrically connecting between the coils.

According to another aspect of the present invention, there is provided a drive motor for a drum washing machine, the drum washing machine drive motor comprising: a stator; a rotor a rotor hat is arranged with a predetermined air gap from the stator, and whose one end is connected to a rotating shaft fixed on the rear surface of a drum; a cover member to which the other end of the rotating shaft is supported, that is fixed to the tub, in which the stator is mounted; and a buffer member disposed between the stator and the cover member.

According to still another aspect of the present invention, there is provided a drum washing machine comprising: a tub that is suspended and supported in the inside in a case, to contain washing water; a drum that is rotatably supported in the inside of the tub to receive laundry; and a drive motor that is mounted on the rear surface of the tub for rotating and driving the drum, wherein the drive motor comprises: a stator including a stator core, a bobbin made of an insulating material and that is wrapped on an outer surface of the stator core, and a coil that is wound around the outer surface of the bobbin; a rotor that is arranged with a predetermined air gap from the stator, and whose one end is connected to a rotating shaft fixed on a rear surface of a drum; and a cover member to which the other end of the rotating shaft is rotatably supported, and that is fixed to a rear surface of the tub, in which the stator core is mounted.

Preferably but not necessarily, the drum washing machine further comprises a buffer portion that is formed integrally with the bobbin and is disposed between the stator core and the cover member, to thus block vibration generated in a motor from being transmitted to the washing machine.

Preferably but not necessarily, the stator core comprises: a first core portion on which a coil is wound; and a second core portion that is integrally extended from the first core portion and that is secured to the cover member, and the buffer portion is extended from one side of the bobbin and is formed to wrap around the outer surface of the second core portion.

Preferably but not necessarily, the drum washing machine further comprises: a first bearing that is mounted in the tub and for rotatably supporting one end of the rotating shaft; and a second bearing that is mounted in the cover member and for rotatably supporting the other end of the rotating shaft.

As described above, in the case of a drive motor for a drum washing machine according to the present invention, bearings for supporting one end of a rotating shaft are provided at a center portion of a drive motor, a cover member on the outer peripheral portion of which a stator is mounted is attached to a rear surface of a tub, to thereby automatically match concentricity between a rotor coupled to a rotating shaft and the stator, and to thus secure a sufficient clearance between the bearings thereby providing a stable support of the rotating shaft.

The drive motor for a drum washing machine according to the present invention is configured to mount a cover member to which a stator is attached in advance on the rear surface of a tub, to thereby make it unnecessary to perform a separate stator assembly, to thus remove a tub bracket for fixing a stator, and to thus shorten a production process, thereby improving the productivity.

In addition, the drive motor for a drum washing machine is configured to have a buffer portion that is formed to be extended from a bobbin or a separate buffer member is provided between a cover member of a metallic material and a stator core of a metallic material, to thus prevent vibration of a motor from being transmitted to the drum washing machine.

Furthermore, in the present invention, a cover member is assembled with a tub in a manner to surround a rotor externally to thereby block noise generated with the rotation of the rotor from being transmitted to the outside of the drum washing machine.

DETAILED DESCRIPTION OF THE INVENTION

Figure 1:
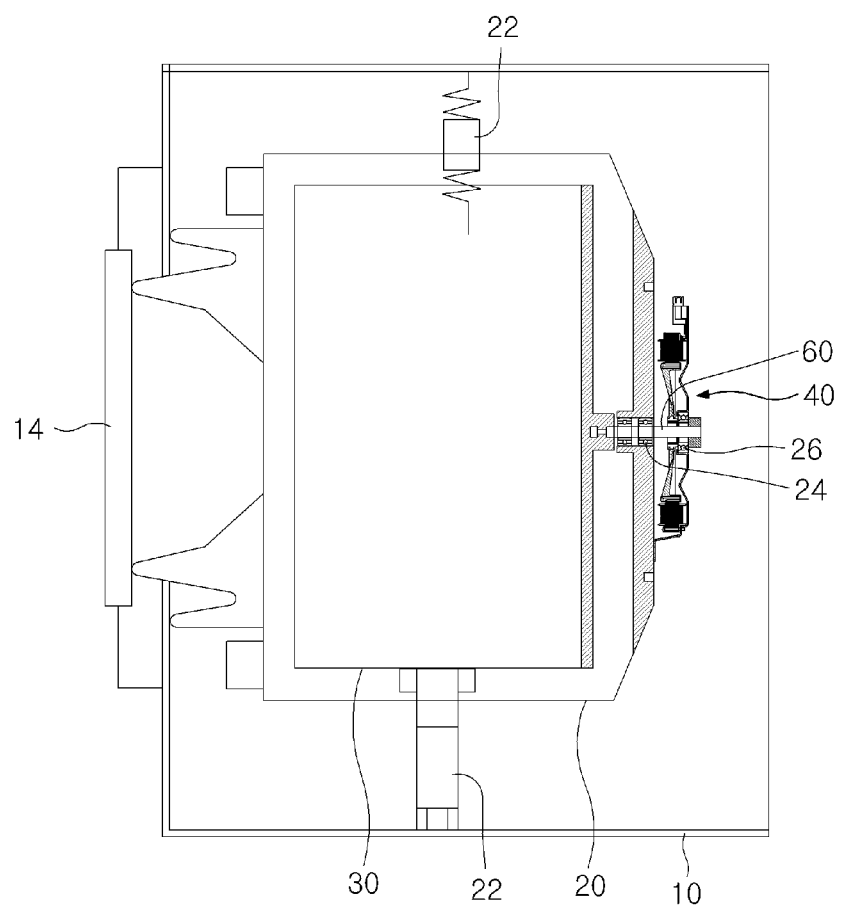
FIG. 1 is a cross-sectional view of a drum washing machine according to a first embodiment of the present invention.

Hereinafter, embodiments of the present invention will be described in detail with reference to the accompanying drawings. In the process, the size and shape of the components illustrated in the drawings may be shown exaggerated for convenience and clarity of explanation. Further, by considering the configuration and operation of the present invention the specifically defined terms can be changed according to user's or operator's intention, or the custom. Definitions of these terms herein need to be made based on the contents across the whole application.

Figure 2:
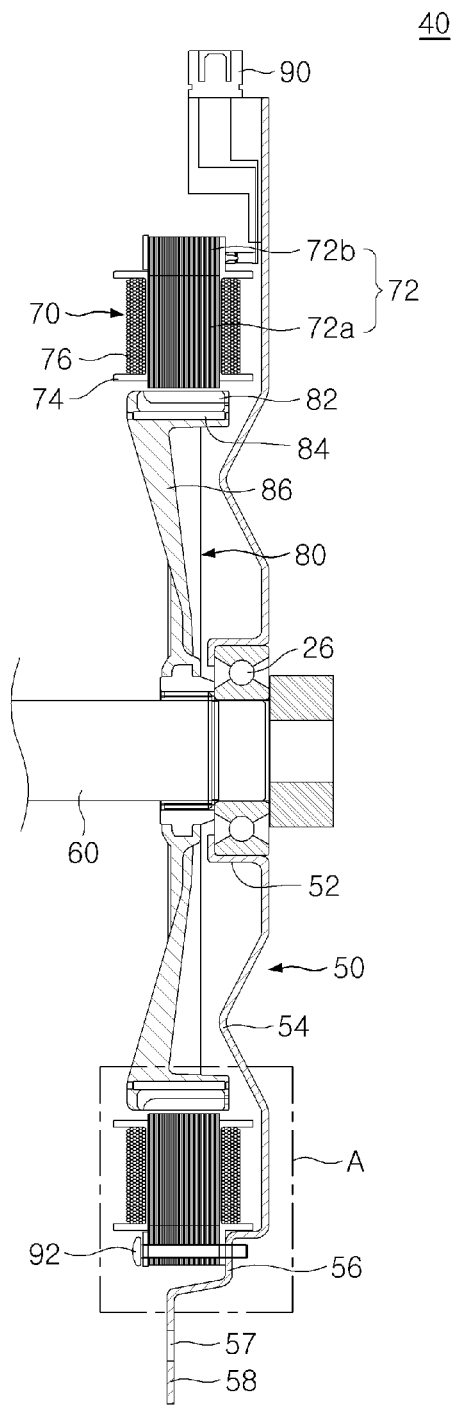
FIG. 2 is an axial cross-sectional view of a drive motor for the drum washing machine according to the first embodiment of the present invention.
Figure 3:
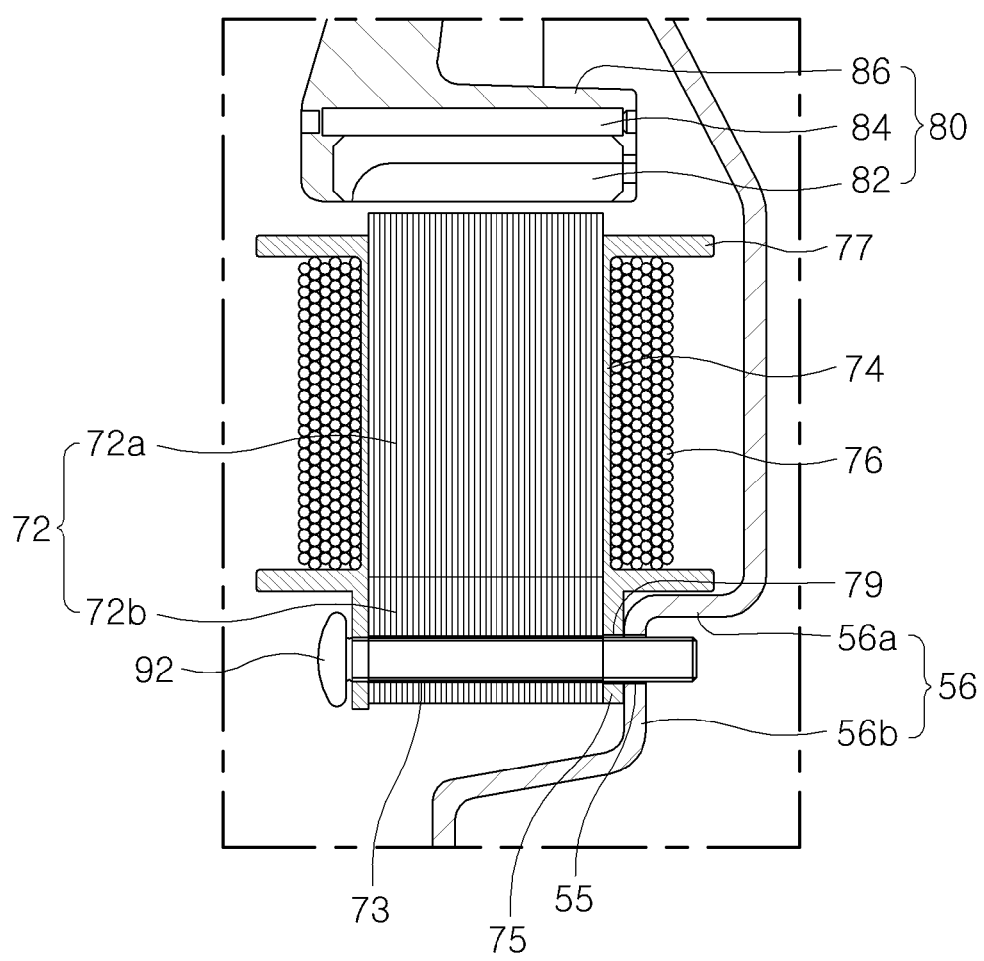
FIG. 3 is an enlarged view of a portion A of FIG. 2.
Figure 4:
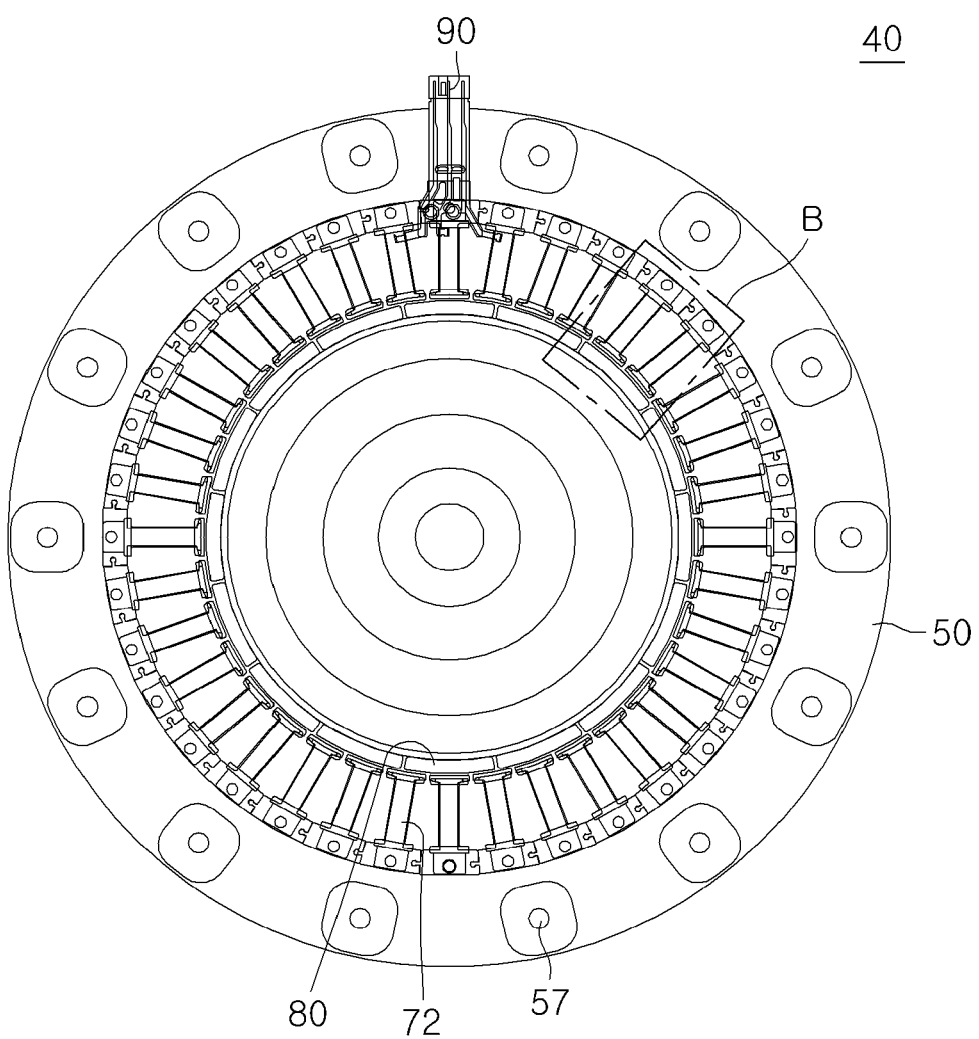
FIG. 4 is a plan view of the drive motor for the drum washing machine according to the first embodiment of the present invention.
Figure 5:
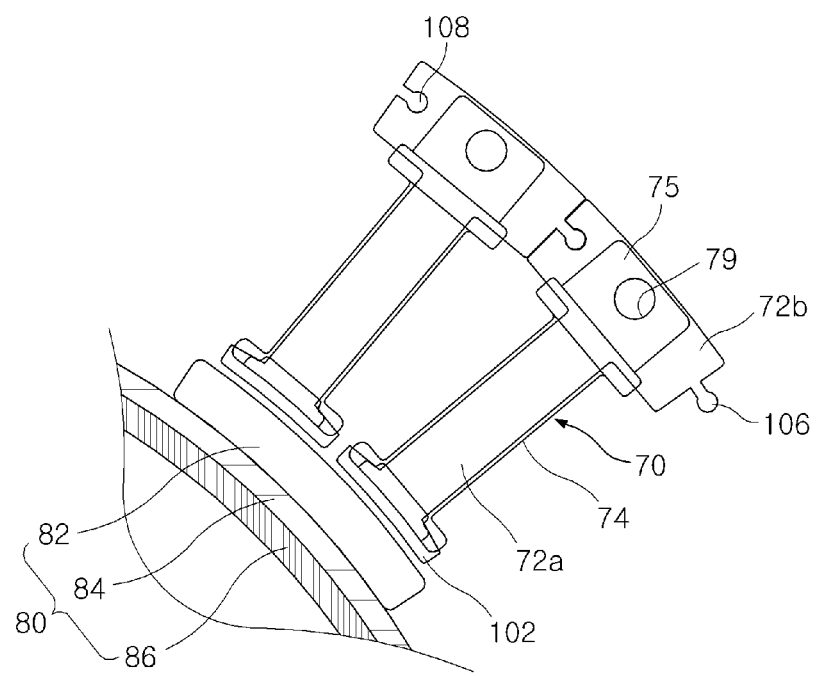
FIG. 5 is an enlarged view of a portion B of FIG. 4.

FIG. 1 is a cross-sectional view of a drum washing machine according to a first embodiment of the present invention. FIG. 2 is an axial cross-sectional view of a drive motor for the drum washing machine according to the first embodiment of the present invention. FIG. 3 is an enlarged view of a portion A of FIG. 2. FIG. 4 is a plan view of the drive motor for the drum washing machine according to the first embodiment of the present invention. FIG. 5 is an enlarged view of a portion B of FIG. 4.

Referring first to FIG. 1, the drum washing machine according to the first embodiment of the present invention includes: a case 10 that forms an external appearance in which an opening through which laundry comes in and out is formed at one end of the case 10 and a door 14 for opening and closing the opening is formed at one end of the opening; a tub 20 that is supported by a suspension support unit 22 in the inside of the case 10, and contains washing water; a drum 30 that is rotatably arranged inside the tub 20 to perform washing and dewatering; and a drive motor 40 that is mounted on the rear surface of the tub 20 for driving the drum 30.

As shown in FIGS. 2 to 5, the drive motor 40 includes: a cover member 50 that is secured to the rear surface of the tub 20; a rotating shaft 60 whose leading end is fixed to the rear surface of the drum 30; a stator 70 fixed to the cover member 50; and an inner rotor 80 that is disposed at a predetermined air gap inside the stator 70 and whose central portion is connected to the rotating shaft 60.

The rotating shaft 60 whose one end is fixed to the drum 30 and passes through a throughhole formed on the rear surface of the tub 20 and whose other end is connected to the inner rotor 80 and that is rotated with the rotation of the inner rotor 80, is rotatably supported by the cover member 50.

A first bearing 24 is mounted in the inner surface of the throughhole of the tub 20, thereby rotatably supporting one end of the rotating shaft 60, and a second bearing 26 is mounted in the inner surface of the cover member 50, thereby rotatably supporting the other end of the rotating shaft 60.

The cover member 50 is formed of a disc shape and made of a metal material, and serves as a motor case to cover the outer surface of the drive motor 40, is secured to the stator 70 to thus play a role of fixing the stator 70, and is mounted on the rear surface of the tub 20 to thus play a role of fixing the drive motor 40 to the tub 20.

The cover member 50 includes: a bearing mounting portion 52 on the inner surface of which a bearing 26 is fixed; a cover portion 54 that is extended in a disc shape from the outer surface of the bearing mounting portion 52 to cover the rear surface of the drive motor; a stator fixing portion 56 that is formed at the end of the cover portion 54, and to which the stator 70 is fixed; and a tub mounting portion 58 that is extended from the stator fixing portion 56 and that is mounted on the rear surface of the tub 20.

The stator fixing portion 56 is provided with a plurality of first coupling holes 55 formed in the circumferential direction so as to be coupled with a stator core 72 by using fastening bolts, and is formed in a convexly protruding shape in which the stator 70 is inserted. In addition, the tub mounting portion 58 is provided with a plurality of second coupling holes 56 formed in the circumferential direction so as to be coupled with the tub 20 by using fastening bolts.

As shown in FIGS. 2 to 5, the stator 70 include: a plurality of split stator cores 72; a bobbin 74 that is partially formed on the outer circumference of each of the stator cores 72 to define a region on which a coil is wound; and a coil 76 wound around the bobbin 74. Each of the split stator cores 72 includes a first core portion 72a in which the bobbin 74 is formed and a second core portion 72b in which connectors 106 and 108 are formed and is formed in an "I" shape, as a whole.

As shown in FIGS. 4 and 5, a tooth portion 102 is formed at the inner end of the first core portion 72a, in which the tooth portion 102 is extended in both lateral directions of the first core portion 72a and is disposed to face a magnet 82, and the connectors 106 and 108 are formed at both side surfaces of the second core portion 72b, so that the stator cores 72 that are disposed adjacent to each other are mutually coupled by means of the connectors 106 and 108, and thus the plurality of split stator cores 72 are arranged in a radial form.

The plurality of stator cores 72 are interconnected by using the connectors 106 and 108 and serve as a back yoke which forms a magnetic circuit.

Here, the connectors 106 and 108 include a coupling protrusion 106 that is formed in a spherical shape at one side of the second core portion 72b, and a locking groove 108 that is formed in a spherical groove shape at the other side of the second core portion 72*b* and that is fitted with the coupling protrusion 106.

Further, in addition to such a structure, the connectors 106 and 108 are also configured to have another structure that pin holes are formed at both sides of the second core portion 72*b* in which pin members are fitted between the pin holes of two adjacent stator cores at a state where the two adjacent stator cores are in contact with each other, to thereby connect between the two adjacent stator cores. Meanwhile, two adjacent stator cores are caulked by using a caulking member at a state where the two adjacent stator cores are in contact with each other, to thereby connect between the two adjacent stator cores.

Here, in addition to the structure that the stator core is formed of split cores and is cross-coupled, as described above, the stator core can be also applied in the form of a single core that is formed integrally with an annular structure.

In the above embodiment, the stator core is configured to have a split structure so that each of the split cores corresponds to each of slots. However, the stator core may have a split structure that a single split core corresponds to a plurality of slots.

In the case of a split-core type stator core, a stator core may be integrally formed in an annular array with a method such as an insert injection by using a BMC (Bulk Molding Compound) molding material. In this case, the connectors may be formed integrally with the stator core. That is, as the split cores are arranged in an annular array in a mold and a connector connected to an output terminal of a coil is disposed at one side of the split core. Then, the split cores are formed integrally in an annular array by an insert injection, while the connectors may be formed integrally with the stator core.

In addition to the bolt coupling method of fixing the stator core 72 and the cover member 50, a method of fixing the stator core 72 and the cover member 50 may be applied by forming projections on the cover member 50 so as to be inserted into insertion holes formed on the stator core 72, and then thermally bonding the projections. In addition, a method of fixing the stator core 72 and the cover member 50 may be applied by press-fitting the stator core 72 into the cover member 50. Besides, any method of fixing the stator core 72 and the cover member 50 can be applied thereto.

The bobbin 74 is formed to wrap around the remaining portion other than both sides of the stator core 72, which serves to insulate the stator core 72. A pair of partition walls 77 are formed at both sides of the bobbin 74, respectively, in order to prevent the coil from being separated from the bobbin 74.

A buffer portion 75 is integrally formed with the bobbin 74 in order to prevent the stator core 72 of a metallic material and the cover member 50 of a metallic material from being in direct contact with each other. The buffer portion 75 is formed integrally with the bobbin 74 and is formed to be wrapped around the outer surface of the second core portion 72*b*.

A throughhole 79 is formed in the buffer portion 75, in which a bolt 92 passes through the throughhole 79.

A stator fixing portion 56 of the cover member 50 includes a first contact portion 56*a* in contact with the outer surface of the partition wall 77C and a second contact portion 56*b* in contact with the buffer portion 75.

In this way, the drive motor 40 for the drum washing machine according to the first embodiment of the present invention includes the bobbin 74 which the buffer portion 75 is integrally formed and is disposed between the stator core 72 of a metallic material and the cover member 50 of a metallic material, thereby preventing direct contact between the metallic stator core 72 and the metallic cover member 50, and blocking the motor vibration from being transmitted to the drum washing machine.

The inner rotor 80 includes a plurality of magnets 82 that are disposed with a certain air gap with an outer surface of the stator core 72; an annular back yoke 84 disposed on the back surface of the magnets 82; and a rotor support 86 to which the magnets 82 and the back yoke 84 are fixed, and to the center of which the rotating shaft 60 is connected.

The rotor support 86 may be formed integrally with the magnets 82 and the back yoke 84 by an insert injection method. In addition, when the rotor support 86 is formed of the metallic material that is the same as the back yoke 84, the back yoke 84 can be removed.

Figure 6:
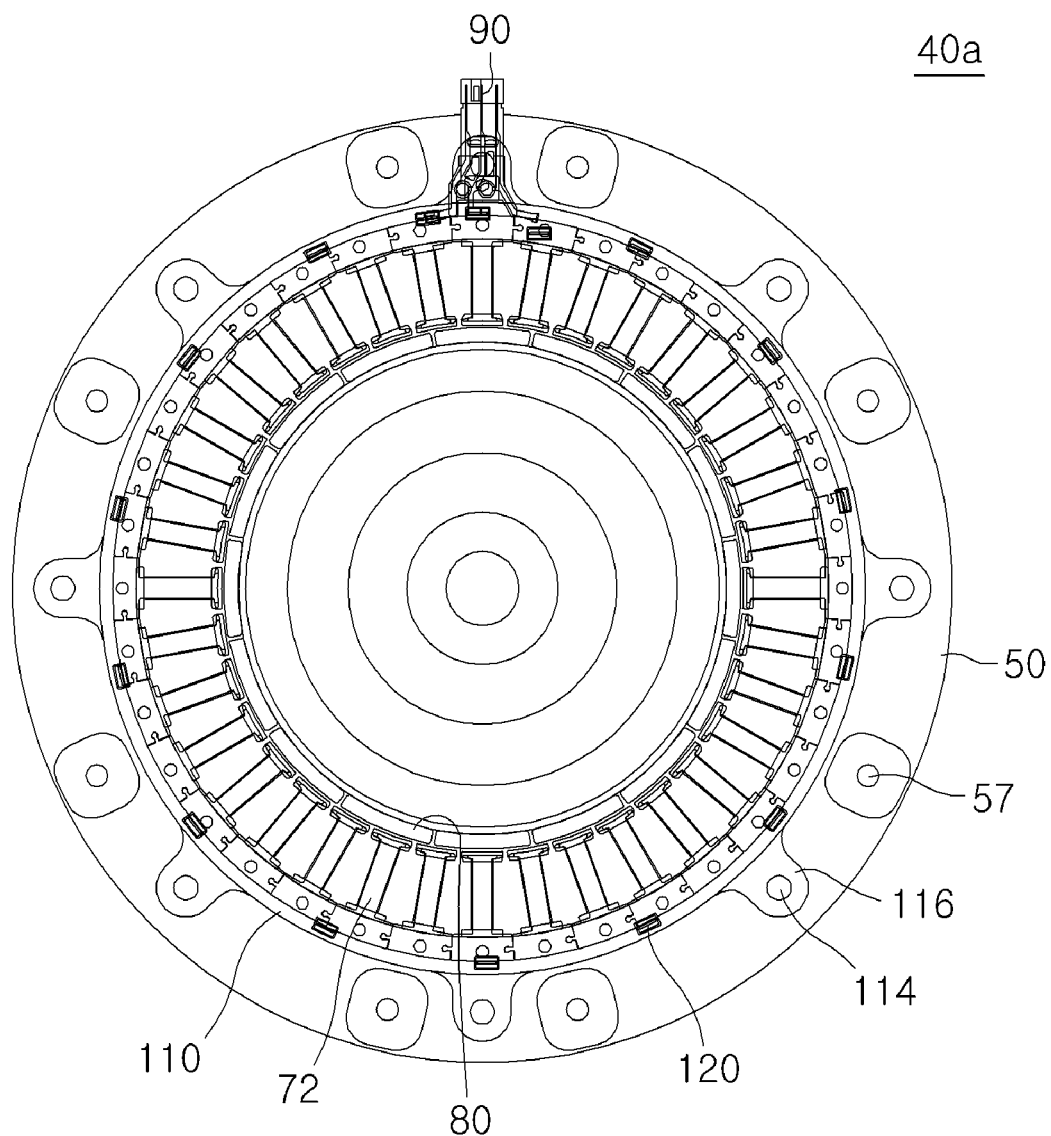
FIG. 6 is a plan view of a drive motor for a drum washing machine according to a second embodiment of the present invention.
Figure 7:
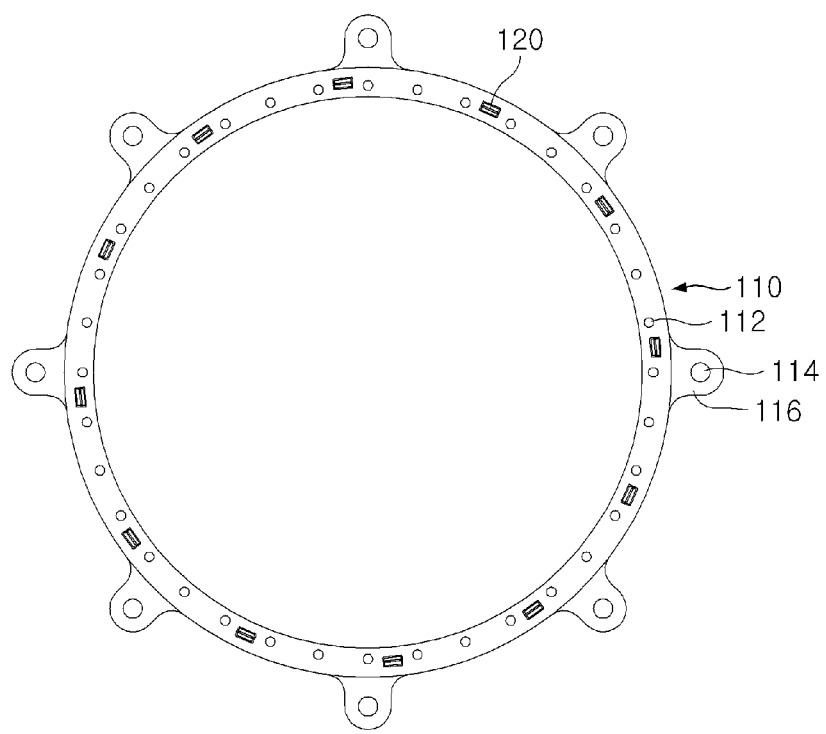
FIG. 7 is a plan view of a buffer member of the drive motor according to the second embodiment of the present invention.

FIG. 6 is a plan view of a drive motor for a drum washing machine according to a second embodiment of the present invention, and FIG. 7 is a plan view of a buffer according to the second embodiment of the present invention.

The drive motor 40*a* according to the second embodiment includes: a cover member 50 that is secured to the bottom of a tub 20 (of FIG. 1); a rotating shaft 60 whose one end is fixed to the rear surface of a drum 30 (of FIG. 1); a stator 70 fixed to the cover member 50; an inner rotor 80 that is disposed at a predetermined air gap inside the stator 70 and is connected to the rotating shaft 60; and a buffer member 110 that is disposed between the cover member 50 and the stator core 72 to thus block the vibration of the drive motor from being transmitted to the drum washing machine.

In the second embodiment, since the cover member 50, the inner rotor 80 and the stator 70 are the same as those described in the first embodiment, the detailed description thereof will be omitted.

The drive motor 40*a* according to the second embodiment adopts the separate buffer member 110 that is disposed between the cover member 50 and the stator core 72 in place of the buffer portion 75 formed in the bobbin 74 of the first embodiment, to absorb vibration. In this matter, the drive motor 40*a* according to the second embodiment differs from the drive motor 40 of the first embodiment.

As shown in FIG. 7, the buffer member 110 is made of a material capable of absorbing vibrations, and is formed in a circular ring shape, in which one surface of the buffer member 110 is in contact with the stator core 72, and the other surface thereof is in contact with the cover member 50 to thus prevent direct intermetallic contact between the cover member 50 and the stator core 72.

The buffer member 110 is provided with a plurality of throughholes 112 that are formed in the circumferential direction thereof in which bolts 92 pass through the throughholes 112, respectively. A plurality of fixing brackets 116 are integrally formed on the outer surface of the buffer member 110 for securing the buffer member 110 to the cover member 50, in which a coupling hole 114 is formed in each of the fixing brackets 116.

In this way, the drive motor 40*a* according to the second embodiment may be provided with the buffer member 110 between the stator core 72 and the cover member 50, thereby blocking the vibration of the motor from being transmitted to the washing machine.

Then, a plurality of wiring units 120 for electrically connecting coils 76 respectively wound around the plurality of stator cores 72 are integrally formed on the upper surface of the buffer member 110.

Figure 8:
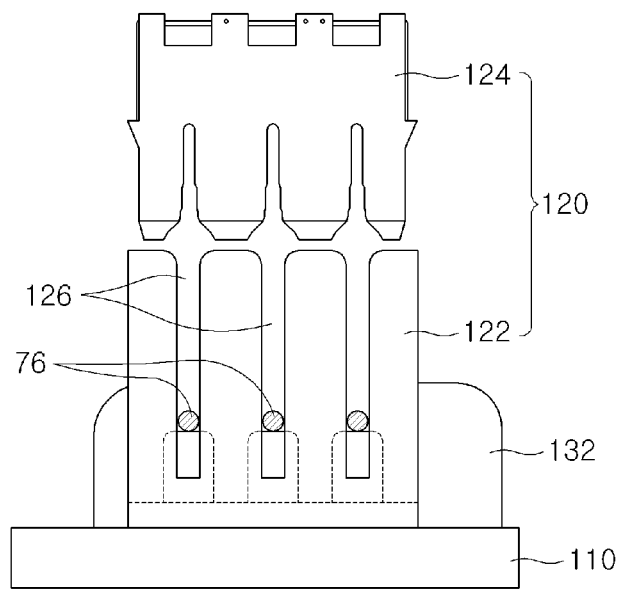
FIG. 8 is a side view of a wiring unit of the drive motor according to the second embodiment of the present invention.
Figure 9:
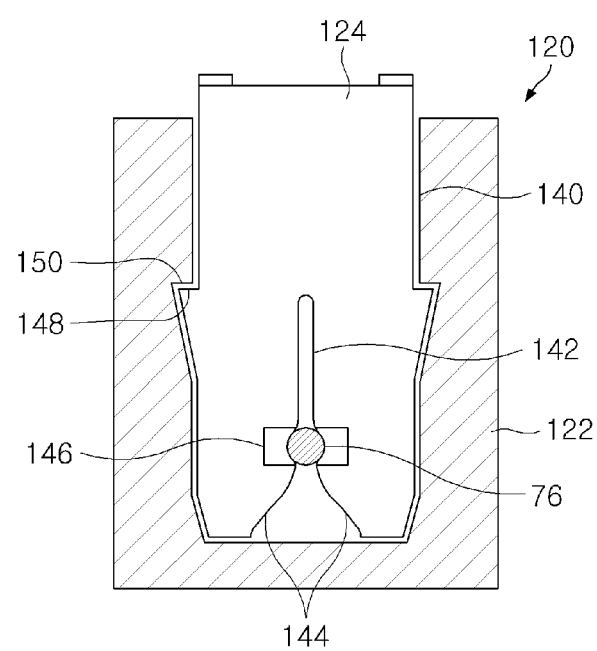
FIG. 9 is a cross-sectional view of the wiring unit of the drive motor according to the second embodiment of the present invention.

As shown in FIGS. 8 and 9, each of the wiring units 120 is integrally formed on the buffer member 110 to thus connect, for example, between two adjacent stator cores 72 or is used to form a neutral point NP of three phases, and includes: a terminal pocket 122 that is provided with a plurality of seating grooves 126 into which ends of two or three strands of the coils 76 are inserted, and an insertion grooves 140 that formed in the terminal pocket 122; and a coil terminal 124 that is inserted into the insertion grooves 140 of the terminal pocket 122 for electrically connecting between the coils 76.

One of a plurality of the wiring units 120 is used to form the neutral point NP at which three-phase coils of U, V, and W phases are mutually wired.

The coil terminal 124 is formed of a metallic material that can be electrically energized to electrically connect between the coils 76. A plurality of slots 142 into which coils 76 are press-fitted are formed at the lower side of the coil terminal 84. Blades 144 are formed on both side ends of each of the slots 142, and thus play a peel-off role of peeling off an insulating outer sheath surrounding the outer surface of the coil 76 when the coil 76 is press-fitted into each of the slots 142.

Further, a coil fixing groove 146 with which the coil 76 is fitted and fixed is formed on the inside of the slot 142.

A locking projection 148 is formed on the side of the coil terminal 124 and a locking recess 150 with which the locking projection 148 is locked is formed on the inner surface of the terminal pocket 122. Thus, when the coil terminal 124 is inserted into the terminal pocket 122, the locking projection 148 is in engagement with the locking recess 150, to thus prevent the coil terminal 124 from being seceded from the terminal pocket 122.

In this way, the operation of the wiring units will be described below. First, the end of each of the coils 76 is seated in the seating groove 126 of each of the terminal pockets 122. Then, the coil terminal 124 is inserted into the insertion groove 140 of the terminal pocket 122. In this case, the coil 76 is fitted into the slot 142. Here, because the spacing of the slot 142 is narrow, an insulating outer sheath surrounding the outer surface of the coil 76 is peeled off by the blades 144 formed at the end of the slot 142, and thus the coil 76 is fixed into the coil fixing groove 146, to thereby electrically connect between the coils 76 by the coil terminal 124.

Figure 10:
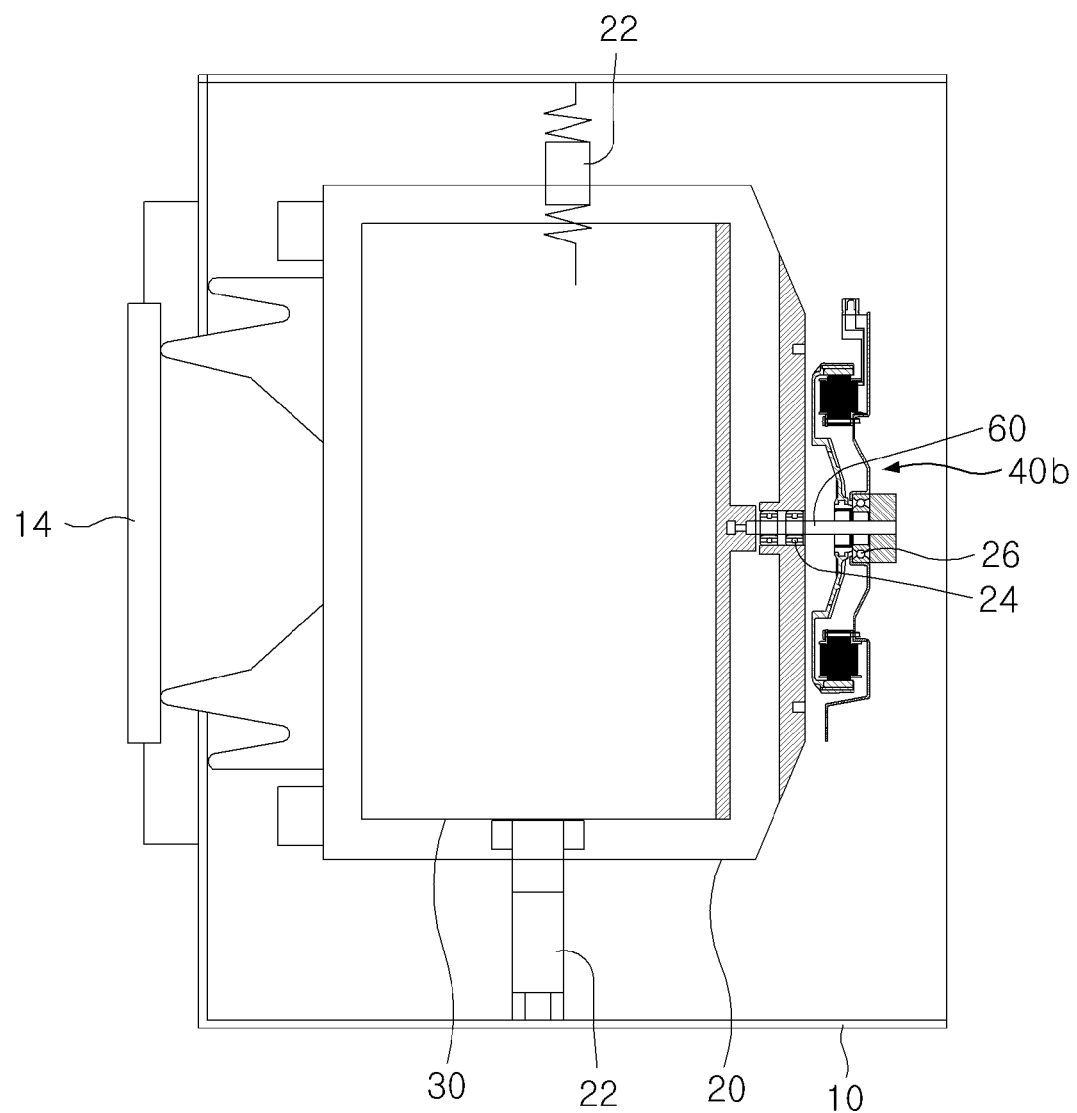
FIG. 10 is a schematic cross-sectional view of the whole drum washing machine according to a third embodiment of the present invention.
Figure 11:
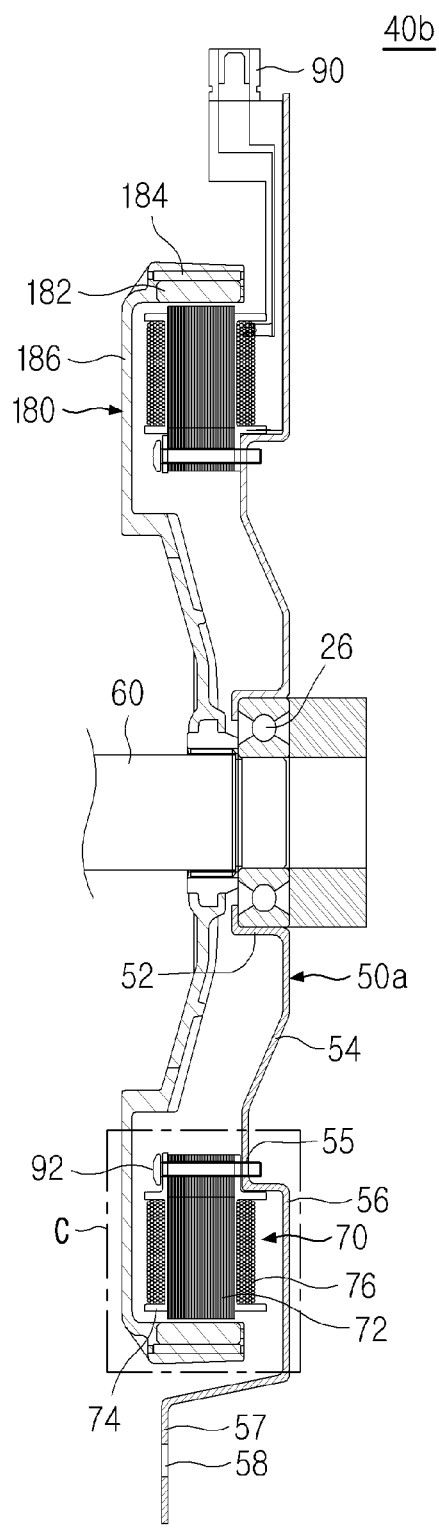
FIG. 11 is an axial cross-sectional close-up view of the drive motor for the drum washing machine according to the third embodiment of the present invention.
Figure 12:
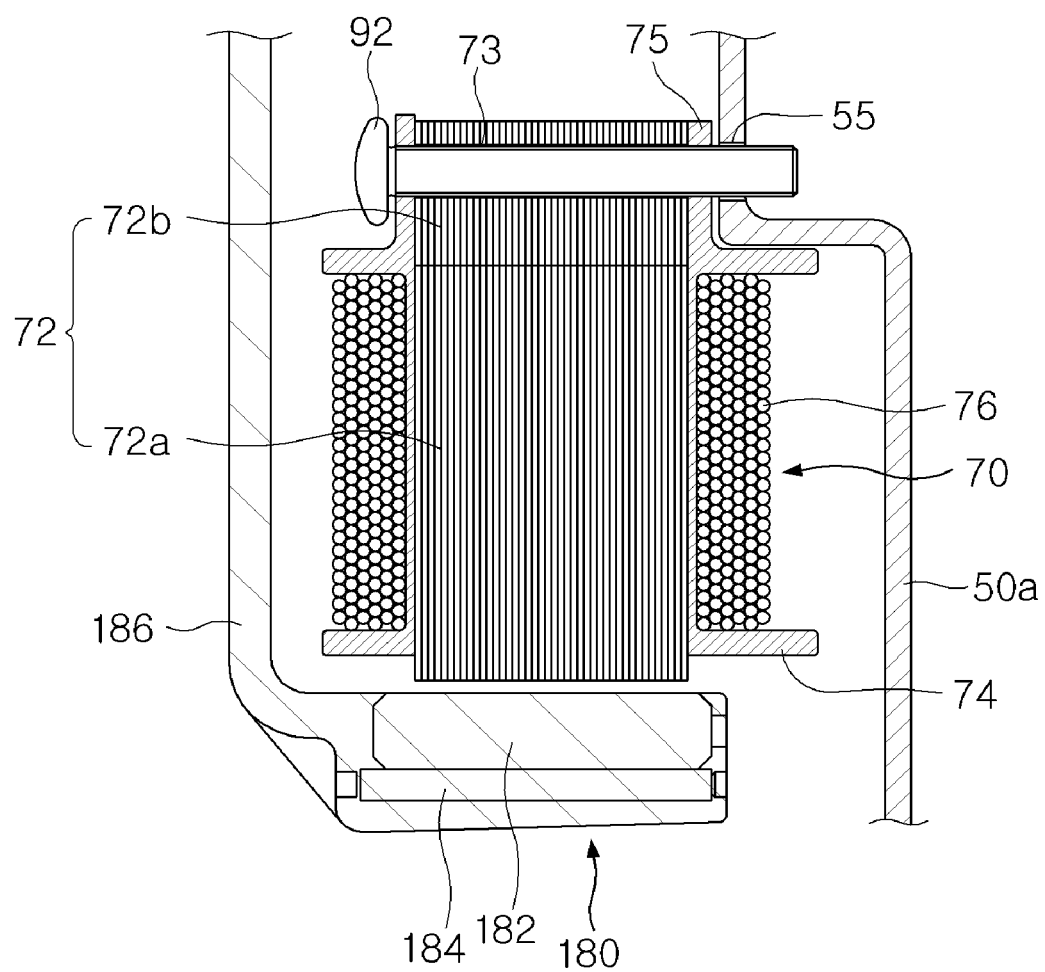
FIG. 12 is an enlarged view of a portion C of FIG. 11.
Figure 13:
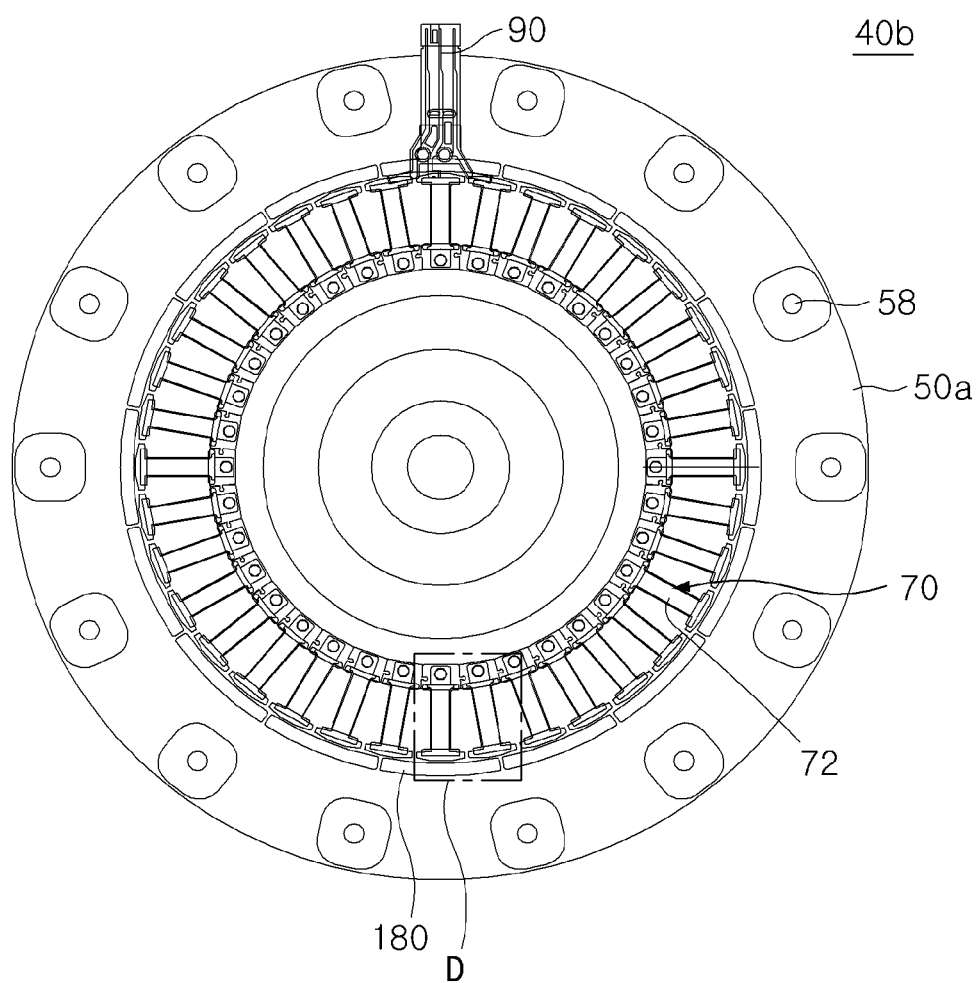
FIG. 13 is a plan view of the drive motor for the drum washing machine according to the third embodiment of the present invention.
Figure 14:
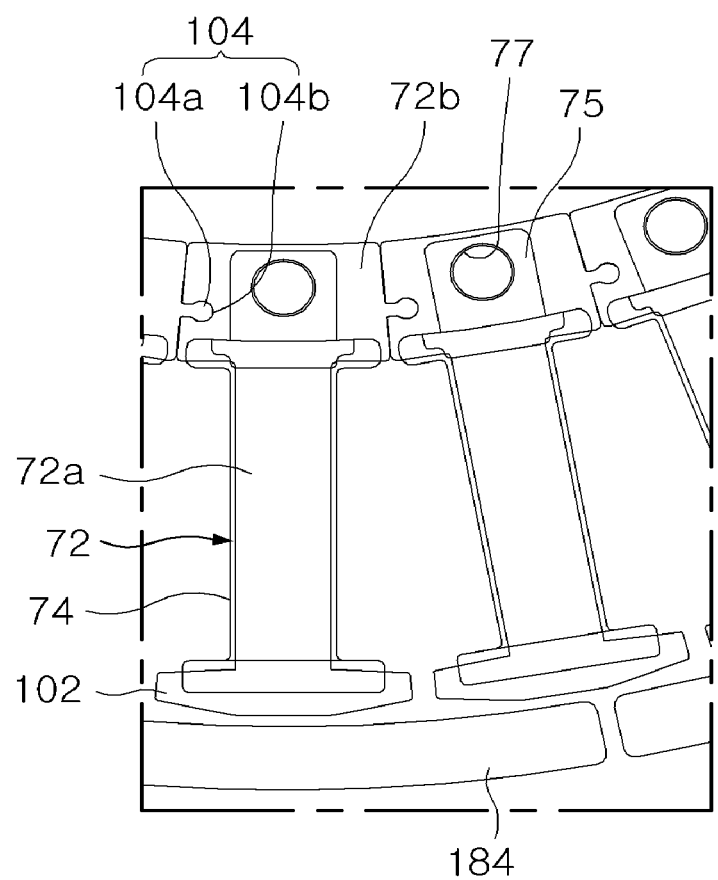
FIG. 14 is a partial enlarged view of a portion D of FIG. 13.

FIG. 10 is a schematic cross-sectional view of the whole drum washing machine according to a third embodiment of the present invention. FIG. 11 is an axial cross-sectional close-up view of the drive motor for the drum washing machine according to the third embodiment of the present invention. FIG. 12 is an enlarged view of a portion C of FIG. 11. FIG. 13 is a plan view of the drive motor for the drum washing machine according to the third embodiment of the present invention. FIG. 14 is a partial enlarged view of a portion D of FIG. 13.

Referring to FIG. 10, the drum washing machine according to the third embodiment includes: a case 10 that forms an external appearance in which an opening through which laundry comes in and out is formed at one end of the case 10 and a door 14 for opening and closing the opening is formed at one end of the opening; a tub 20 that is supported by a suspension support unit 22 in the inside of the case 10, and contains washing water; a drum 30 that is rotatably arranged inside the tub 20 to perform washing and dewatering; and a drive motor 40b that is mounted on the rear surface of the tub 20 for directly driving the drum 30.

As shown in FIG. 11, the drive motor 40b includes: a cover member 50a that is secured to the rear surface of the tub 20; a rotating shaft 60 whose leading end is fixed to the rear surface of the drum 30; a stator 70 fixed to the cover member 50a; and an outer rotor 180 that is disposed at a predetermined air gap outside the stator 70 and is connected to the rotating shaft 60.

The rotating shaft 60 passes through a throughhole formed on the rear surface of the tub 20 and is connected to the outer rotor 180 to thus be rotated with the rotation of the outer rotor 180, in which one end of the rotating shaft 60 is fixed to the rear surface of the drum 30 and the other end thereof is rotatably supported by the cover member 50a.

A first bearing 24 is mounted in the inner surface of the throughhole of the tub 20, thereby rotatably supporting one end of the rotating shaft 60, and a second bearing 26 is mounted in the inner surface of the cover member 50a, thereby rotatably supporting the other end of the rotating shaft 60.

The cover member 50s is formed in a disc shape and made of a metallic material, and serves as a motor case to cover the outer surface of the drive motor 40b, is secured to the stator 70 to thus play a role of fixing the stator 70, and is mounted on the rear surface of the tub 20 to thus play a role of fixing the drive motor 40b to the tub 20.

The cover member 50a includes: a bearing mounting portion 52 on the inner surface of which the second bearing 26 is fixed; a cover portion 54 that is extended in a disc shape from the bearing mounting portion 52 to cover the rear surface of the drive motor 40b; a stator fixing portion 56 that is formed at the end of the cover portion 54, and to which the stator 70 is fixed; and a tub mounting portion 58 that is extended from the stator fixing portion 56 and that is mounted on the rear surface of the tub 20.

The stator fixing portion 56 is provided with a plurality of first coupling holes 55 formed in the circumferential direction so as to be coupled with a stator core 72 by using fastening bolts, and is formed in a convexly protruding shape in which the stator 70 is inserted. In addition, the tub mounting portion 58 is provided with a plurality of second coupling holes 57 formed in the circumferential direction so as to be coupled with the tub 20 by using fastening bolts.

In addition, a power connection connector 90 for applying a power to the coil 76 is mounted on the outer surface of the cover member 50a.

In addition to the structure that the power connection connector 90 is mounted on the cover member 50a, the power connection connector 90 may be applicable in a structure of being mounted in the stator core 72.

As shown in FIG. 12, the stator 70 includes: a plurality of the stator cores 72; a bobbin 74 made of an insulating material and is wrapped on the outer peripheral surface of the stator cores 72; and a coil 76 wound around the outer peripheral surface of the bobbin 74.

For the conventional stator cores, the stator cores is integrally formed with a cover member by an insert molding method and the like, by using a thermosetting resin, for example, a BMC (Bulk Molding Compound) molding material such as polyester, in which case the bobbin and the coil are pre-assembled with the stator cores and are inserted into a mold, to then perform an insert molding process. As a result, disconnection of the coils may happen in the course of moving the pre-assembled stator cores, or inserting the pre-assembled stator cores into the mold, or disconnection of the coils may happen due to an injection pressure in the insert molding process.

Since a plurality of the stator cores 70 are fixed on the cover member 50a of the metallic material in an annular form in the third embodiment, an easy and convenient assembly may be achieved and a risk of disconnection may be prevented.

Each of the stator cores 72 includes: a first core portion 72a on which a coil is wound; and a second core portion 72b that integrally extends from one side of the first core portion 72a and is engaged with the cover member 50a. Here, a throughhole 73 is formed in the second core portion 72b in which a bolt 92 passes through the throughhole 73.

As shown in FIG. 14, a tooth portion 102 is formed at the inner end of the first core portion 72a, in which the tooth portion 102 is extended in both lateral directions of the first core portion 72a and is disposed to face a magnet 182, and a connector portion 104 is formed at both side surfaces of the second core portion 72b, so that the stator cores 72 that are disposed adjacent to each other are mutually coupled by means of the connector portion 104, and thus the plurality of split stator cores 72 are arranged in a radial form.

The plurality of stator cores 72 are interconnected by using the connector portion 104 and serve as a back yoke which forms a magnetic circuit.

Here, the connector portion 104 includes a coupling protrusion 104a that is formed in a spherical shape at one side of the second core portion 72b, and a locking groove 104b that is formed in a spherical groove shape at the other side of the second core portion 72b and that is fitted with the coupling protrusion 104a.

Further, in addition to such a structure of the connector portion 104, the connector portion 104 is also configured to have another structure that pin holes are formed at both sides of the second core portion 72b in which pin members are fitted between the pin holes of two adjacent stator cores at a state where the two adjacent stator cores are in contact with each other, to thereby connect between the two adjacent stator cores. Meanwhile, two adjacent stator cores are caulked by using a caulking member at a state where the two adjacent stator cores are in contact with each other, to thereby connect between the two adjacent stator cores.

Here, in addition to the structure that the stator core is formed of split cores and is cross-coupled, as described above, the stator core can be also applied in the form of a single core that is formed integrally with an annular structure.

In the case of a split-core type stator core, a stator core may be integrally formed in an annular array with an insert injection method by using a BMC (Bulk Molding Compound) molding material. In this case, the connector portion may be formed integrally with the stator core. That is, as the split cores are arranged in an annular array in a mold and the connector portion is disposed at one side of the split core. Then, the split cores are formed integrally in an annular array by an insert injection, while the connector portion may be formed integrally with the stator core.

In addition to the bolt coupling method of fixing the stator core 72 and the cover member 50a, a method of fixing the stator core 72 and the cover member 50a may be applied by forming projections on the cover member 50a so as to be inserted into insertion holes formed on the stator core 72, and then thermally bonding the projections. In addition, a method of fixing the stator core 72 and the cover member 50a may be applied by press-fitting the stator core 72 into the cover member 50a. Besides, any method of fixing the stator core 72 and the cover member 50a can be applied thereto.

The bobbin 74 is formed to wrap around the remaining portion other than both sides of the stator core 72, which serves to insulate the stator core 72. A coil 76 is wound to wrap the outer surface of the stator core 72.

A buffer portion 75 is integrally formed with the bobbin 74 in order to prevent the stator core 72 of a metallic material and the cover member 50a of a metallic material from being in direct contact with each other. The buffer portion 75 is formed integrally with the bobbin 74 and is formed to be wrapped around the outer surface of the second core portion 72b. A throughhole 79 is formed in the buffer portion 75, in which a bolt 92 passes through the throughhole 79.

The drive motor 40b for the drum washing machine according to the third embodiment of the present invention includes the bobbin 74 which the buffer portion 75 is integrally formed and is disposed between the stator core 72 of a metallic material and the cover member 50a of a metallic material, thereby preventing direct contact between the metallic stator core 72 and the metallic cover member 50a, and blocking the motor vibration from being transmitted to the drum washing machine.

The outer rotor 180 includes a plurality of magnets 182 that are disposed with a certain air gap with an outer surface of the stator core 72; an annular back yoke 184 disposed on the back surface of the magnets 182; and a rotor support 186 to which the magnets 182 and the back yoke 184 are fixed, and to the center of which the rotating shaft 60 is connected.

The rotor support 186 may be formed integrally with the magnets 182 and the back yoke 184 by an insert injection method. In addition, when the rotor support 186 is formed of the metallic material that is the same as the back yoke 184, the back yoke 184 can be removed.

As described above, according to the present invention, the second bearing 26 for supporting an end of the rotating shaft 60 is provided in the center portion of the drive motor, and the cover member 50 or 50a is mounted on the rear surface of the tub 20 in which the stators 70 are mounted on the outer periphery of the cover member, to thereby automatically match concentricity between a rotor 80 or 180 coupled to the rotating shaft 60 and the stators 70, and to thus secure a sufficient clearance between the first and second bearings 24 and 26 thereby providing a stable support of the rotating shaft 60.

In addition, the drive motor according to the present invention is configured so that stator cores are arranged in an annular form on the cover member, and the cover member is assembled on the tub, to thereby make it unnecessary to perform a separate process of arranging the stator cores in an annular shape and to thus shorten the manufacturing process.

In addition, the drive motor according to the present invention includes a buffer portion that is formed integrally with a bobbin between a cover member of a metallic material and a stator core of a metallic material, to thus block prevent direct intermetallic contact between the cover member and the stator core to thereby prevent vibration of a motor from being transmitted to the drum washing machine.

In addition, the drive motor according to the present invention is configured so that a cover member is assembled with a tub in a manner to surround a rotor externally to thereby block noise generated with the rotation of the rotor from being transmitted to the outside of the drum washing machine.

As described above, the present invention has been described with respect to particularly preferred embodiments. However, the present invention is not limited to the above embodiments, and it is possible for one of ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention may be applied to a drive motor and a drum washing machine including the same, in which a cover member is mounted on the rear surface of a tub in which stators are mounted in the cover member in advance, to thus remove tub brackets for mounting the stators thereby shortening manufacturing process and improve the productivity, and a buffer portion is mounted between the cover member of a metallic material and the stator cores of a metallic material, to thereby prevent vibration of the motor from being transmitted to the drum washing machine.

What is claimed are:

1. A drive motor for a drum washing machine, the drive motor comprising:
    a cover member attached to a rear surface of a tub of a drum washing machine;
    a stator attached to an inner side of the cover member, the stator including a stator core, a bobbin of an insulating material that is wrapped on an outer surface of the stator core, and a coil that is wound around an outer surface of the bobbin;
    a rotor that is arranged with a predetermined air gap from the stator core; and
    a rotating shaft to which the rotor is fixed, one end portion of the rotating shaft being fixed to a rear surface of a drum disposed inside the tub, the other end portion thereof being rotatably supported in the cover member, and an intermediate portion thereof being rotatably supported in the tub.

2. The drive motor for a drum washing machine according to claim 1, further comprising a buffer portion that is formed integrally with the bobbin and is disposed between the stator core and the cover member, to absorb vibration generated in a motor.

3. The drive motor for a drum washing machine according to claim 1, wherein the cover member comprises:
    a bearing mounting portion to which a bearing for rotatably supporting the rotating shaft is fixed;
    a cover portion that is extended in a disc shape from the bearing mounting portion to cover the rotor and the stator;
    a stator fixing portion that is formed at an end of the cover portion, and to which the stator is fixed; and
    a tub mounting portion that is extended from the stator fixing portion and that is mounted on a rear surface of the tub.

4. The drive motor for a drum washing machine according to claim 1, wherein the stator core comprises: a first core portion on which the coil is wound; and a second core portion that is integrally extended from an outer surface of the first core portion and that is secured to the cover member.

5. The drive motor for a drum washing machine according to claim 1, wherein the stator core is bolt-fastened to the cover member, the stator core is thermal-bonded with the cover member, or the stator core is press-fitted with the cover member.

6. The drive motor for a drum washing machine according to claim 2, wherein a pair of partition walls are vertically extended from both sides of the bobbin, respectively, to thus prevent the coil from seceding, and wherein the buffer portion is extended from one of the partition walls.

7. The drive motor for a drum washing machine according to claim 1, wherein a pair of partition walls are vertically extended from both sides of the bobbin and a buffer portion is extended from one of the partition walls;
    the cover member includes a stator fixing portion inside of which the stator core is fixed; and
    wherein the stator fixing portion comprises: a first contact portion that is bent at a right angle to contact an outer surface of the partition walls; and a second contact portion that is extended from the first contact portion in an horizontal direction to contact the buffer portion.

8. The drive motor for a drum washing machine according to claim 1, further comprising a buffer member that is disposed between the stator core and the cover member to absorb vibration generated by a drive motor.

9. The drive motor for a drum washing machine according to claim 8, wherein the buffer member is formed in a ring shape, a plurality of through-holes through which bolts pass are formed in a circumferential direction of the buffer member, and a plurality of fixing brackets for fixing the buffer member to the cover member are formed in an outer surface of the buffer member.

10. The drive motor for a drum washing machine according to claim 8, further comprising a wiring unit that is provided in the buffer member and for electrically connecting between coils wound on neighboring stator cores.

11. The drive motor for a drum washing machine according to claim 10, wherein the wiring unit comprises: a terminal pocket that is integrally formed with the buffer member and into which the coil is inserted; and a coil terminal that is made of a metallic material, and inserted into the terminal pocket for electrically connecting between the coils.

* * * * *